(12) United States Patent
Hester et al.

(10) Patent No.: US 7,069,479 B2
(45) Date of Patent: Jun. 27, 2006

(54) METHOD AND APPARATUS FOR OBTAINING DIAGNOSTIC DATA FOR A DEVICE ATTACHED TO A COMPUTER SYSTEM

(75) Inventors: Jeffrey Richards Hester, Mantorville, MN (US); Michael James Miller, Pine Island, MN (US); Brian Lee Morger, Preston, MN (US); Shad Henry Thorstenson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/289,969

(22) Filed: Nov. 7, 2002

(65) Prior Publication Data

US 2004/0093538 A1 May 13, 2004

(51) Int. Cl.
*G60F 11/00* (2006.01)
(52) U.S. Cl. .............................. 714/45; 714/33; 714/37
(58) Field of Classification Search .................. 714/37, 714/45, 33, 44, 25
See application file for complete search history.

(56) References Cited

U.S. PATENT DOCUMENTS 5,619,644 A * 4/1997 Crockett et al. ............... 714/45
5,862,316 A * 1/1999 Hagersten et al. ............ 714/15
6,047,353 A * 4/2000 Vishlitzky et al. .......... 711/111

* cited by examiner

Primary Examiner—Robert Beausoliel
Assistant Examiner—Yolanda L Wilson
(74) Attorney, Agent, or Firm—Roy W. Truelson (57) ABSTRACT

A peripheral device (which is preferably a disk drive) can automatically collect trace data upon detecting certain error conditions. The peripheral device has the ability to selectively alter the range of state data collected in a trace depending on the error type. Preferably, the device includes a programmable processor executing a control program. A set of trace switches, each enabling a corresponding set of trace points, can be independently set by the control program. An error trace identification table identifies, for each error type, a corresponding set of trace switches. If an error is encountered, the trace switches corresponding to the error type are determined from the table, and the switches are set accordingly. In another invention aspect, a set of trap switches in the device can be set to trap on the occurrence of a specific error type, thereby supporting a more detailed error analysis.

17 Claims, 8 Drawing Sheets

TRACE IDENTIFICATION SWITCH ENABLE MASK

| SWITCH NAME | DESCRIPTION | TRACE ID: SWITCH ENABLE MASK VALUE |
|---|---|---|
| IDS_HST | HOST INTERFACE | 0000 0000 0000 0001 BINARY - 0001 HEX |
| IDS_ENQ | ENQUEUE COMMAND | 0000 0000 0000 0010 BINARY - 0002 HEX |
| IDS_DEQ | DEQUEUE COMMAND | 0000 0000 0000 0100 BINARY - 0004 HEX |
| IDS_CMD | SCSI COMMAND | 0000 0000 0000 1000 BINARY - 0008 HEX |
| IDS_CAC | CACHING | 0000 0000 0001 0000 BINARY - 0010 HEX |
| IDS_SRV | SERVO CONTROLLER | 0000 0000 0010 0000 BINARY - 0020 HEX |
| IDS_DRV | DRIVE OPERATION | 0000 0000 0100 0000 BINARY - 0040 HEX |
| IDS_REC | ERROR RECOVERY | 0000 0000 1000 0000 BINARY - 0080 HEX |
| IDS_RAS | REASSIGN | 0000 0001 0000 0000 BINARY - 0100 HEX |
| IDS_MOT | MOTOR CONTROL | 0000 0010 0000 0000 BINARY - 0200 HEX |

Figure 4

| ERROR TYPE | MASK VALUE |
|---|---|
| ○ ○ ○ | ○ ○ ○ |
| 0B/44/00 | 0059 |
| ○ ○ ○ | ○ ○ ○ |
| 02/04/00 | 0208 |
| ○ ○ ○ | ○ ○ ○ |
| REC'D ABORT CMD | 005B |
| ○ ○ ○ | ○ ○ ○ |

324

501 — ERROR TYPE column
502 — MASK VALUE column
503 — HOST CRC ERR → 0B/44/00 / 0059 → IDS_HST, IDS_CMD, IDS_CAC, IDS_DRV
504 — NOT RDY SPINDLE FAIL → 02/04/00 / 0208 → IDS_CMD, IDS_MOT
505 — REC'D ABORT CMD → 005B → IDS_CMD, IDS_HST, IDS_DRV, IDS_CAC, IDS_ENQ

Figure 5

TRAP ENABLE MASK

| SWITCH NAME | DESCRIPTION | TRAP SWITCH ENABLE MASK VALUE |
|---|---|---|
| TES_KCQ | SPECIFIC SNS KEY/CODE/QUAL | 0000 0000 0000 0001 BINARY - 0001 HEX |
| TES_TMO | COMMAND TIMEOUT | 0000 0000 0000 0010 BINARY - 0002 HEX |
| TES_ABT | ABORTED COMMAND | 0000 0000 0000 0100 BINARY - 0004 HEX |
| TES_CRC | CRC ERROR | 0000 0000 0000 1000 BINARY - 0008 HEX |
| TES_SIR | CAUSE SIR INSTEAD OF HANG CONDITION | 1000 0000 0000 0000 BINARY - 8000 HEX |

601

KEY CODE QUALIFIER DATA

| BYTE 3 | BYTE 2 | BYTE 1 | BYTE 0 |
|---|---|---|---|
| RESERVED | SENSE KEY | SENSE CODE | SENSE QUALIFIER |

602

COMMAND TIMEOUT DATA

| BYTE 1 | BYTE 0 |
|---|---|
| TIMER HIGH BYTE | TIMER LOW BYTE |

METHOD AND APPARATUS FOR OBTAINING DIAGNOSTIC DATA FOR A DEVICE ATTACHED TO A COMPUTER SYSTEM

FIELD OF THE INVENTION

The present invention relates to digital data systems, and in particular, to the collection of diagnostic data concerning error conditions associated with peripheral devices attached to computer systems.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto (often known as peripheral devices) such as keyboards, monitors, tape drives, disk drives, network coupling hardware or other communications hardware such as modems, wired or fiber-optic transceivers, etc. The CPU is the heart of the system. It executes the instructions which comprise a computer program and directs the operation of the other system components.

Early computer systems performed all or nearly all of the processing in a single place, i.e., the CPU. As systems have evolved and grown far more complex, it has become necessary to allocate different processing functions to different components of the system. This distribution of function removes the burden of supporting many low level operations from the CPU, so that the CPU (or multiple CPUs) can spend a greater proportion of their time directly executing user application programs. In particular, peripheral devices have grown in sophistication to perform many of the functions related to their operation and maintenance, with minimal support required from the computer system to which they are attached (the "host" system).

An outstanding example of a peripheral device which manages much of its own function is the rotating magnetic disk drive data storage device. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. One or more processors on the disk drive itself manage the functions of communication with a host computer, selecting operations for execution, decoding recorded servo information to identify the actuator location, controlling the motion of the actuator, selected one of multiple heads for reading or writing, encoding and decoding data stored on the disk surface, controlling the speed of a disk spindle motor, recovering from misread data, and many other functions.

In general, all of this low-level activity is hidden from the host CPU and operating system processes executing on the CPU. When the host wishes to read data on or write data to a disk drive, it sends the drive a command to do so, along with an address at which the data is assigned. The disk drive does the rest. It interprets the address to determine at which disk surface, track and sector the data is stored, and performs all necessary operations (such as actuator motion, track and sector identification, track centering, disk rotation, etc) to access the data. It would be burdensome to the point of impracticality to perform all these functions in the host CPU. Building this capability into the peripheral device (such as a disk drive) not only enables the CPU to devote its time to other things, but makes it possible to perform certain functions which wouldn't be performed at all if it had been necessary to do so in the CPU.

This increasing sophistication of disk drives and other peripheral devices has often included on-board diagnostic and recovery capability. For example, it is now nearly universal for a disk drive to include a number of soft error recovery procedures, whereby in the event that the drive fails to properly interpret data read by the head as it passes over a desired data block recorded on the disk surface, the drive takes a sequence of actions of increasing complexity in to read the data. Various other examples of on-board diagnostic and recovery capabilities exist.

Although it is possible for the designers of a peripheral device to anticipate a certain range of operational problems, and even to provide recovery capability for some types of errors, there will be instances of errors for which it is difficult for the designers to provide a recovery in advance, either because the error itself was unanticipated, or due to the nature of the error, or otherwise. In these situations, it is desirable to obtain as much useful information about the error as practical. Such diagnostic information can but used to support further diagnostic and recovery activities at a different level (which may involve human intervention), or to support possible design alterations of the device.

A known method of obtaining such additional information is to collect trace data. Trace data involves recording certain state variables (such as register values) when pre-specified code paths are taken during execution of a program, such as an on-board control program for controlling the operation of a disk drive. Trace data has the potential to yield very detailed information about device state at critical junctures, and thus, to a trained analyst, can be used to diagnose many conditions.

Although the collection of trace data can be very useful, one of the drawbacks to collecting trace data is the volume of such data generated. I.e., device state may involve the condition of a large number of registers or other elements, and code points which trigger the collection of trace data may be numerous or frequently encountered. Once a trace is begun, it can quickly consume a large amount of storage space.

As a result of the storage demands for trace data, initiating of traces is usually left to human intervention after a problem has occurred. I.e., if a problem occurs in a peripheral device which requires resolution, a diagnostic expert is called in and the expert may determine to run traces, possibly selecting such trace points and/or state data as needed. Running such a trace may require that special software be loaded into the device. Sometimes, the conditions which caused the problem are no longer present by the time the diagnostic expert is ready to collect trace data. Many problems which are not immediately critical are simply ignored, and no trace data collected, due to the difficulty of running traces.

In order to assist a diagnostics expert, some peripheral devices have built-in capability to collect trace data upon the occurrence of certain error conditions. By this means, it is hoped to obtain some meaningful data at approximately the time that the error occurred. However, this capability is in general very limited, because it is deemed unwise to automatically start the collection of voluminous trace data. Therefore, only the most general state data is collected, and the number of code points which trigger collection is very small.

It would be desirable to provide improved means for the collection of diagnostic data in a peripheral device, and in particular, data at or near the time that an error occurs, without simultaneously overwhelming the device with irrelevant trace data.

SUMMARY OF THE INVENTION

In accordance with one aspect of the present invention, a peripheral device has the ability to automatically start the collection of trace data upon the occurrence of certain error conditions. In order to avoid being overwhelmed with superfluous data, the peripheral device has the ability to selectively alter the range of state data collected in a trace depending on the type of error which caused trace data to be collected, i.e., to alter the conditions (trace points) at which trace data is collected, and/or to alter the state data which is collected in the event that a trace point is encountered.

In a preferred embodiment, the peripheral device is a rotating magnetic disk drive data storage device having an on-board controller containing a programmable processor and a control program. The control program generally governs the operation of the disk drive and communication with a host. Various conditions in the drive's subsystems or subfunctions may cause any of various errors to be detected. A set of trace switches can be independently set by the control program, each trace switch enabling a corresponding set of trace points and state data to be collected upon encountering any trace point in the set. An error trace identification table identifies, for each type of error, a corresponding set of trace switches to be set. In the event that an error is encountered, the set of trace switches corresponding to the type of error is automatically determined from the error trace identification table, the switches are set accordingly, and a trace is automatically collected for later analysis.

In another aspect of the invention, a set of trap switches in a peripheral device can be set to trap on the occurrence of a specific error type, thereby supporting a more detailed analysis of the cause of an error. Typically, an error and corresponding trace will first occur and be reported to the host system, and a system administrator will then set the trap switches if it is necessary to perform a more detailed analysis of the problem.

By collecting trace data in a selective manner, the volume of trace data generated is significantly reduced. This in turn makes it possible to collect trace data over a longer interval, or to collect more detailed trace data relating to the problem which triggered the error.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
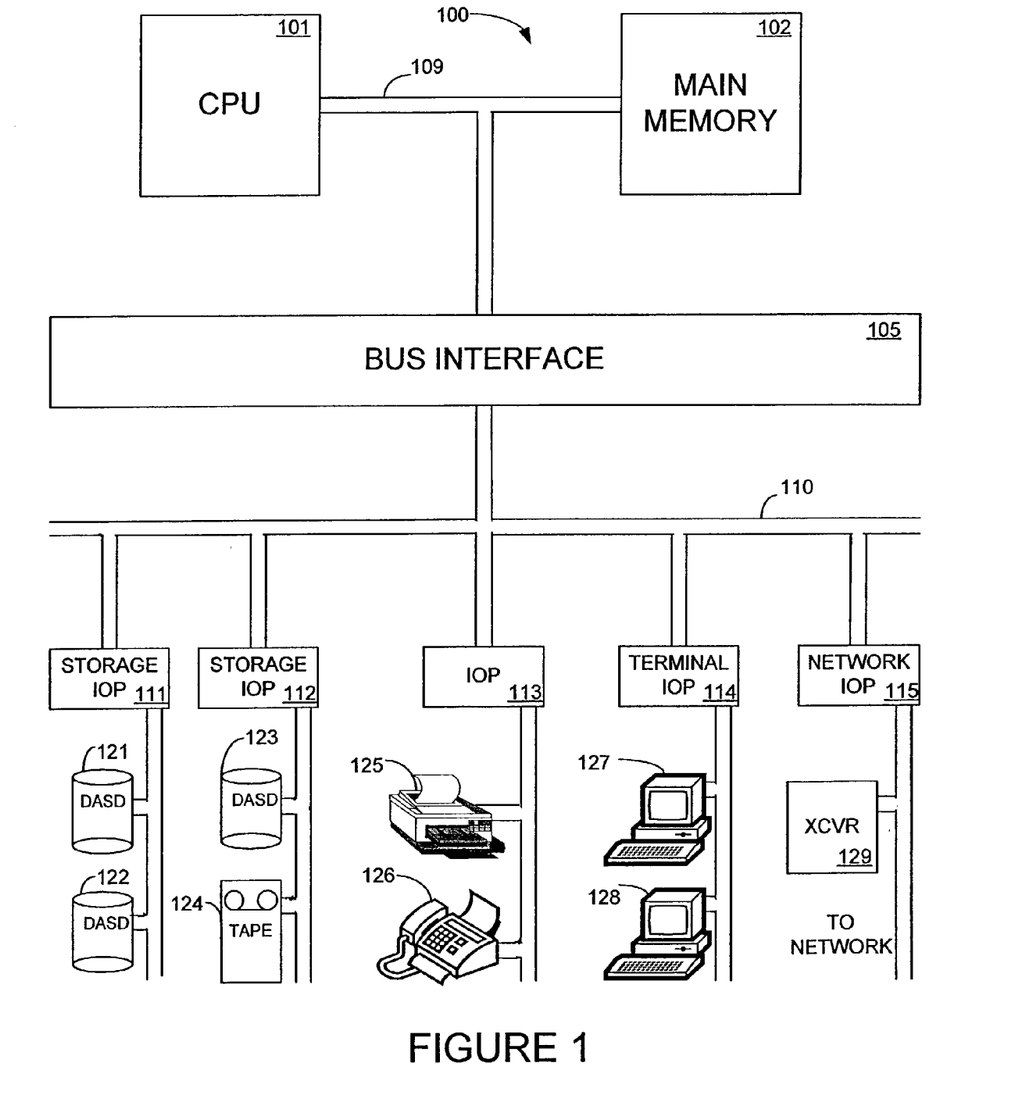
FIG. 1 is a high-level block diagram of the major hardware components of a host computer system having a variety of attached peripheral devices, according to the preferred embodiment of the present invention.

Referring to the Drawing, wherein like numbers denote like parts throughout the several views, FIG. 1 is a high-level representation of the major hardware components of a host computer system 100 having a variety of attached peripheral devices, any of which may utilize a trace data collection technique, in accordance with the preferred embodiment of the present invention. CPU 101 is a programmable processor which processes instructions and other data from main memory 102. Main memory 102 is preferably a random access memory using any of various memory technologies, in which data is loaded from storage or otherwise for processing by CPU 101.

Memory bus 109 provides a data communication path for transferring data among CPU 101, main memory 102 and I/O bus interface unit 105. I/O bus interface 105 is further coupled to system I/O bus 110 for transferring data to and from various I/O units. I/O bus interface 105 communicates with multiple I/O processing units (IOPs) 111–115 through system I/O bus 110. System I/O bus may be, e.g., an industry standard PCI bus, or any other appropriate bus technology. The IOPs support communication with a variety of storage and I/O devices, such as direct access storage devices (DASD) 121–123 (which are typically rotating magnetic disk drive storage devices, although they could alternatively be other devices, including arrays of disk drives configured to appear as a single large storage device to a host), tape drive 124, printer 125, fax 126, terminals 127–128, and network transceiver 129 for communicating with a network such as the Internet or a local area network.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 109 is shown in FIG. 1 as a relatively simple, single bus structure providing a direct communication path among CPU 101, main memory 102 and I/O bus interface 105, in fact memory bus 109 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 110 are shown as single respective units, system 100 may in fact contain multiple I/O bus interface units 105 and/or multiple I/O buses 110. While multiple IOPs are shown which separate a system I/O bus 110 from various communications paths running to the various I/O devices, it would alternatively be possible to connect some or all of the I/O devices directly to one or more system I/O buses.

Computer system 100 depicted in FIG. 1 has multiple attached terminals, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system.

While various system components have been described and shown at a high level, it should be understood that a typical computer system contains many other components not shown, which are not essential to an understanding of the present invention.

One or more peripheral devices in computer system 100 collect custom trace data, as more fully described herein. In the exemplary embodiment, a rotating disk drive data storage device collects trace data relative to its operation, it being understood that other types of peripheral devices might collect such trace data.

Figure 2:
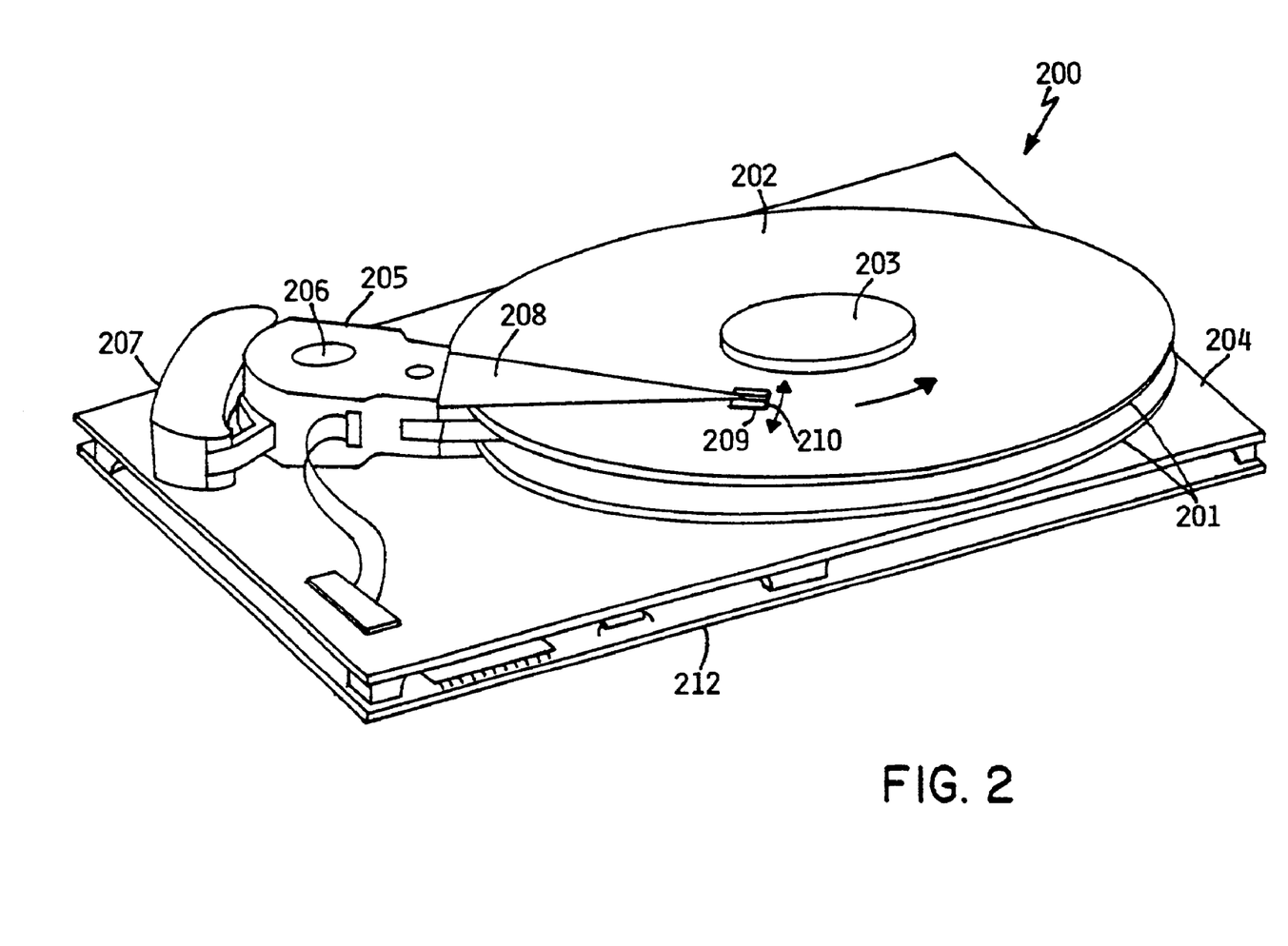
FIG. 2 is a simplified representation of a rotating magnetic disk drive storage device, for use in accordance with the preferred embodiment of the present invention.

FIG. 2 is a simplified drawing of a rotating magnetic disk drive storage device 200, for use in collecting custom trace data, in accordance with the preferred embodiment. Disk drive 200 comprises rotatable disks 201, which are rigidly attached to hub assembly or spindle 203, which is mounted for rotation on disk drive base or housing 204. Spindle 203 and disks 201 are driven by a drive or spindle motor at a constant rotational velocity in the counter-clockwise direction, when viewed from above as shown in FIG. 2. The spindle motor (not visible in FIG. 2) is contained within hub assembly 203; the spindle motor is typically a brushless DC motor having a multi-phase electromagnetic stator and a permanent magnet rotor, in which the different phases of the stator are sequentially driven with a drive current to rotate the rotor. A cover (not shown) mates with base 204 to enclose and protect the disk and actuator assemblies.

Each disk 201 is formed of a solid disk-shaped base or substrate, having a hole in the center for the spindle. The substrate is commonly aluminum, although other materials (e.g. glass) are possible. The substrate is coated with a thin layer of magnetizable material, and may additionally be coated with a protective layer. Data is recorded on the top and bottom surfaces 202 of each disk in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle. Within the sectors are blocks of data, representing the smallest unit of data transfer (read or write).

A moveable actuator assembly 205 positions transducer heads adjacent the data on the surface to read or write data. Actuator assembly 205 includes a solid block surrounding the axis having comb-like prongs extending toward the disk. A plurality of head/suspension assemblies 208 are rigidly attached to the prongs of actuator 205. An aerodynamic slider (head) 209 with a read/write transducer 210 is located at the end of each head/suspension assembly 208 adjacent disk surface 202, there being one head 209 for each disk surface 202 containing data. Actuator 205 rotates through an arc about shaft 206 parallel to the axis of the spindle, driven by electromagnetic motor 207, to position the transducer heads. The actuator motor 207 is an electromagnetic coil mounted on the actuator comb and a set of permanent magnets mounted in a stationary position on the base or cover; when energized, the coil imparts a torque to the comb in response to the magnetic field created by the permanent magnets. The actuator motor rotates the actuator to position the head over a desired data track (a seek operation). Once the head is positioned over the track, the constant rotation of the disk will eventually bring the desired sector and block adjacent the head, and the entire block of data is then read or written. The time spent waiting after completion of the seek until the desired sector is adjacent the head is known as latency, and thus the time required to commencement of a data access operation is the sum of seek and latency times. The time required to read (or write) a block of data, once the actuator has been positioned as described, is relatively small in comparison to seek and latency times.

Electronic modules for controlling the operation of the drive and communicating with another device, such as a host computer, are mounted on circuit card 212. In this embodiment, circuit card 212 is shown mounted outside the enclosure formed by base 204 and the cover. However, the card 212 could also be mounted inside the head/disk enclosure, or a portion of the electronics may be mounted inside the enclosure, while another portion is mounted outside the enclosure.

Figure 3:
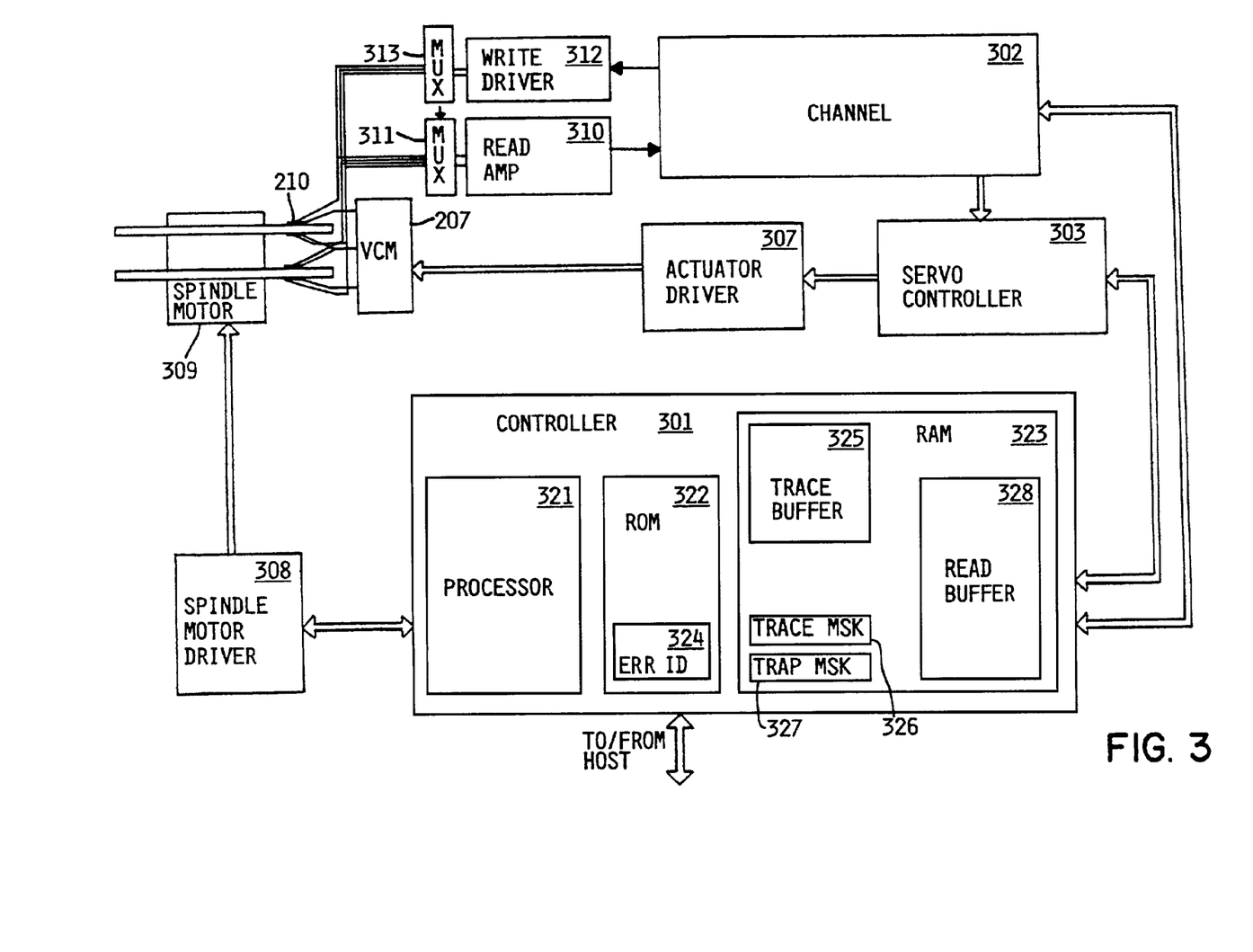
FIG. 3 is a high level diagram of the major electronic elements of a disk drive storage device, according to the preferred embodiment.

FIG. 3 is a high-level diagram of the major electronic elements of disk drive 200, showing how these are connected to one another and to the transducer heads, actuator motor and spindle motor, according to the preferred embodiment. File controller 301 provides a data interface to host computer system 100. Controller 301 also provides general control of the operation of disk drive 200, including such functions as command interpretation, sector mapping, power-up routines, diagnostics, error recovery, etc. In particular, file controller 301 initiates traces customized to particular types of errors, as described in greater detail herein. Channel electronics 302 provides modulation and demodulation function for data being written to and read from the disk surface. Servo controller 303 interprets servo signals obtained from reading servo fields on the disk to control the actuator motor (VCM 207); it also responds to seek signals from file controller 301. Spindle motor drive circuitry 308 provides drive current to spindle motor 309, driving the motor at a desired rotational velocity.

Transducers 210 are attached via lead wires to write multiplexer 313 and to read multiplexer 311, which are in turn coupled to write driver 312 and read amplifier 310, respectively. Read amp 310 provides input to channel electronics 302. Channel electronics provides input to write drive 312. Multiplexers 311 and 313 select one of the heads for writing or reading, responsive to a control signal from file controller 301. Magnetic patterns representing data or servo signals are sensed by magneto-resistive read elements in transducers 210, amplified by read amp 310, and provided to channel electronics 302. Channel electronics preferably includes a partial-response maximum likelihood (PRML) filter for decoding data signals into coherent data for use by a host system. When writing data, channel electronics 302 encodes data according to a pre-determined encoding format, and provides this data to write driver 312, which in turn drives current through an inductive write element to cause the data to be written on the disk surface.

Positioning of transducers 210 is achieved by a servo feedback loop system comprising transducers 210, read amp 310, channel electronics 302, servo controller 303, actuator driver 307, and actuator motor 207. Transducers 210 read servo fields recorded at periodic intervals on disk surfaces 202; these are amplified by read amp 310; channel electronics 302 separate the servo fields from user data; servo controller decodes servo signals received from channel 302 to identify the track and position error, determine actuator drive current need to follow or seek according to desired parameters, and provides actuator motor drive circuitry 307 with a signal indicating the necessary drive current. Actuator motor drive circuitry 307 in turn provides drive current to actuator voice coil motor (VCM) 207, positioning actuator 205 to a desired location (follow mode) or accelerating/decelerating the actuator in accordance with a desired profile (seek mode).

File controller 301 preferably includes programmable processor 321 which executes a control program resident in read-only memory (ROM) 322. ROM 322 is a non-volatile semiconductor random access memory, the contents of which are not lost when disk drive 200 is powered down. ROM 322 preferably includes error trace identification table 324 for setting trace switches according to a type of error, as explained further herein. For additional flexibility, table 324 might alternatively be stored on a reserved portion of a disk surface 202 and loaded into RAM 323 when the drive is powered on. File controller also includes volatile read/write memory (RAM) 323. RAM 323 is the general working storage used by controller 301. RAM 323 preferably contains a single addressable memory space, which may be allocated by controller 301 to various uses and for storing internal state variables necessary for drive operation. In particular, RAM 323 temporarily stores collected trace data 325, until the trace data can be written to disk. RAM 323 further includes a read buffer 328 of data read from the disk surfaces and intended for transmission to a host. Read buffer 328 may have any conventional structure. Data may remain in the read buffer some time after it is transmitted to the host, and will sometimes be read again. RAM 323 further includes trace identification switch enable mask 326, which is used to enable tracing of selective sets of trace points, and trap enable data 327, which is used to enable trapping on specific errors, as described further herein.

Although certain disk drive features are shown and described above, such as separate magneto-resistive read and inductive write transducers elements, it should be understood that these are by way of describing a preferred embodiment only, and it would be possible to practice the present invention using different transducer elements or other alternative disk drive design features, now known or hereafter developed. It should further be understood that various electronic components such as file controller 301, channel 302, servo controller 303, etc. are shown in FIG. 3 as discrete entities for illustrative purposes, and that one or more of these may be combined as a single module, or may be embodied in multiple modules. In particular, elements of the controller 301 may in fact be implemented as a single module, or may be implemented as multiple modules. RAM 323 may be a single or multiple modules, and may use multiple storage technologies; e.g., a portion of RAM 323 may be static RAM, while another portion is dynamic RAM. It should further be understood that the preferred allocation of ROM and RAM is dependent in part of the cost of currently available technology, and that as memory technologies develop it may be preferable to use a single monolithic memory such as non-volatile RAM, or some other combination of memory technologies. It should further be understood that various disk drive components not essential to an understanding of the present invention have been omitted from FIGS. 2 and 3 for clarity of illustration.

Trace identification switch enable mask 326 contains a plurality of bits, each bit corresponding to a respective trace identification "switch". The "switch" is hardware and/or software which enables and disables a subset of trace points in the control program for controller 301, according to the value of the corresponding bit in trace mask 326. Each bit in trace mask 326 can be independently set, so that each subset of trace points in the control program can be independently enabled or disabled. Trace mask 326 is shown in FIG. 3 in RAM 323. However, as will be understood, since it may be necessary to load the value of trace mask 326 into a register in processor 321 on a frequent basis, it would alternatively be possible to dedicate a specially architected register, or general purpose register in processor 321, for that purpose.

Figure 4:
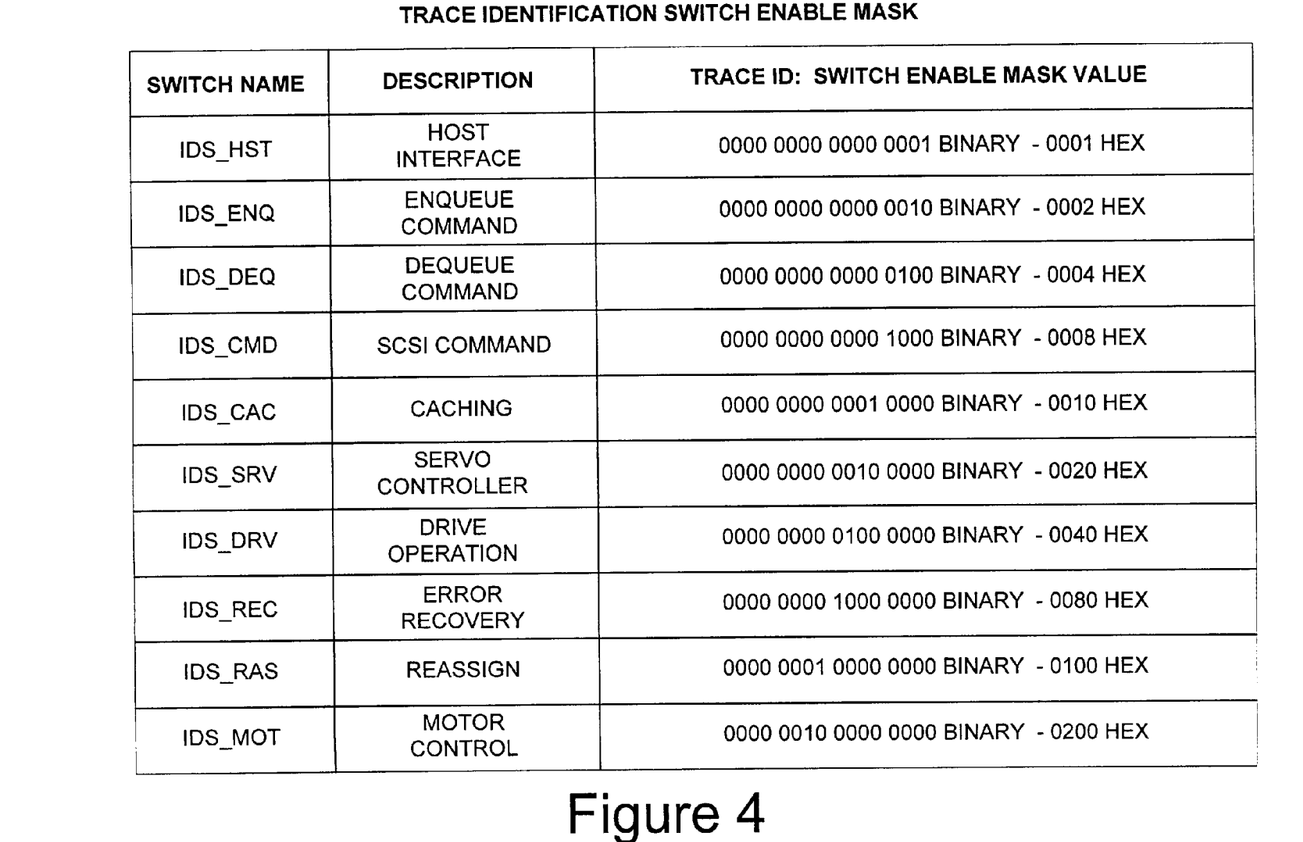
FIG. 4 is a table of representative values of the trace identification switch enable mask, showing the meaning of various mask bits, according to the preferred embodiment.

FIG. 4 is a table of representative values of the trace identification switch enable mask 326, showing the meaning of various mask bits, according to the preferred embodiment. In this embodiment, a 16-bit mask is used, it being understood that the mask could be of a different size. As shown in FIG. 4, each switch (IDS_HST, IDS_ENQ, etc.) corresponds to a respective bit in the mask. E.g., IDS_HST corresponds to 0001 hex, being the lowest order bit of the mask. The switch IDS_CMD corresponds to 0008 hex. If one wishes, e.g., to set switches IDS_HST and IDS CMD, the mask value is set to 0009 hex.

Host interface switch (IDS_HST) enables a subset of trace points relating to low-level handling of the interface bus between drive 200 and host 100. Enqueue Command switch (IDS_ENQ) enables a subset of trace points relating to placing commands on an internal queue for execution. Dequeue Command switch (IDS_DEQ) enables a subset of trace points relating to selecting and removing commands from the queue for execution. SCSI Command switch (ID-_CMD) enables a subset of trace points showing the handling of a type of command received from the host; this subset differs from the IDS_HST in that it is more general and follows commands at a higher level. Caching switch (IDS_CAC) enables a subset of trace points relating to the management of the read cache in RAM 323. Servo Controller switch (IDS_SRV) enables a subset of trace points relating to management of servo controller 303 function. Drive Operation switch (IDS_DRV) enables a subset of trace points relating to transfer of data to and from controller 301 (i.e., RAM 323), channel 302 and the disk surface. Error Recovery switch (IDS_REC) enables a subset of trace points within code routines used to recover from data errors. Reassign switch (IDS_RAS) enables a subset of trace points within code routines which reassign data to different disk sectors, typically because an originally assigned disk sector is defective. Motor Control switch (IDS_MOT) enables a subset of trace points relating to spindle motor commutation and control of spindle motor driver 308.

In the preferred embodiment, each subset of trace points is disjoint from any other subset, although this needn't be the case. Although FIG. 4 illustrates a representative set of switches and corresponding bit values, a drive may contain other or additional switches than those shown in FIG. 4.

For each type of error, there is a corresponding value to which trace mask 326 should be set to enable the switch or switches most closely related to the source of the error. This mask value is obtained from error trace identification table 324.

Figure 5:
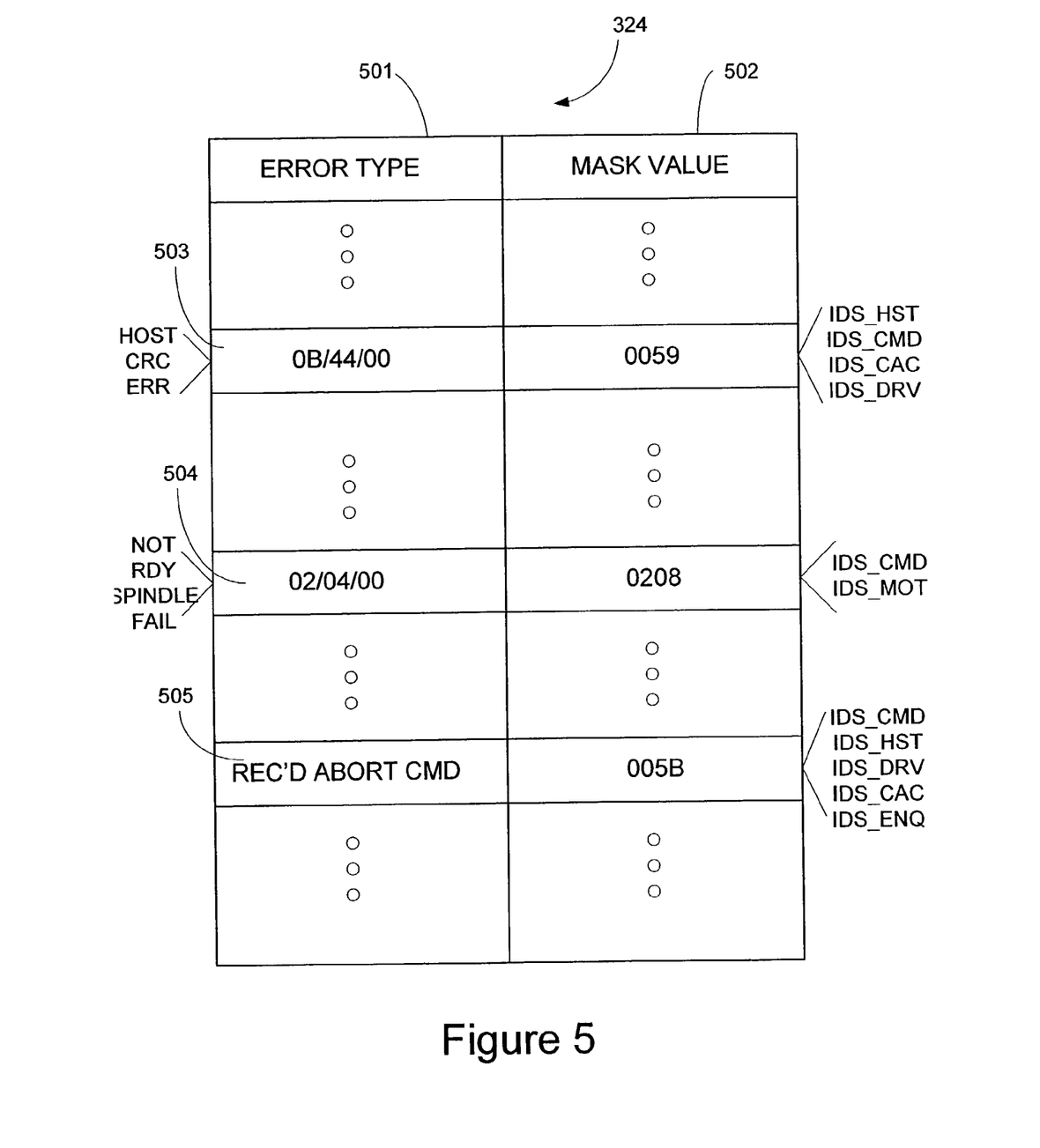
FIG. 5 illustrates the general structure of an error trace identification table, according to the preferred embodiment.

FIG. 5 illustrates at a conceptual level the general structure of error trace identification table 324, according to the preferred embodiment. As shown in FIG. 5, table 324 contains a plurality of entries, each entry associating an error type 501 with a corresponding mask value 502. Three entries 503–505 are shown by way of example in FIG. 5, it being understood that table 324 typically contains a significantly larger number of entries. Entry 503 contains an error type, represented as a SCSI key/code/qualifier combination, of 0B/44/00. This error type is interpreted as a Host CRC error. The corresponding mask value for this error type is 0059 hex. Such a mask value will set the four switches IDS_HST, IDS_CMD, IDS_CAC and IDS_DRV. Entry 504 contains error type 02/04/00, interpreted as a Not Ready, Spindle Fail error. The corresponding mask value for this error type is 0208 hex, which will cause switches IDS_CMD and IDS_MOT to be set. Entry 505 contains an "error" type corresponding to a received abort command, i.e., the drive received a command from the host to abort. The corresponding mask value for this error type is 005B hex, meaning that swithces IDS_CMD, IDS_HST, IDS_DRV, IDS_CAC and IDS_ENQ will be set. The example entry 505 demonstrates that, for purposes of error tracing, an "error" need not be limited to errors reported to the host using the SCSI key/code/qualifier protocol. In general, any condition which the drive can detect and which may be desirable to trace can be considered an "error" which triggers tracing, and would accordingly have a corresponding entry in table 324.

As will be appreciated, it may be desirable to use wildcard values in table 324 for certain error types, e.g., a qualifier value for some key and code values may be a wildcard, so that any error matching the key/code combination, regardless of qualifier, is assigned the same mask value. Furthermore, table 324 may contain a default mask value for all errors not specifically listed. Finally, some error types may have a mask value of zero, meaning that no trace points will be enabled upon the occurrence of an error of that type. An example of such an error type may be a soft error when reading data on the disk surface, where the drive's soft error recovery procedure recovers from the soft error in due course.

Figure 6:
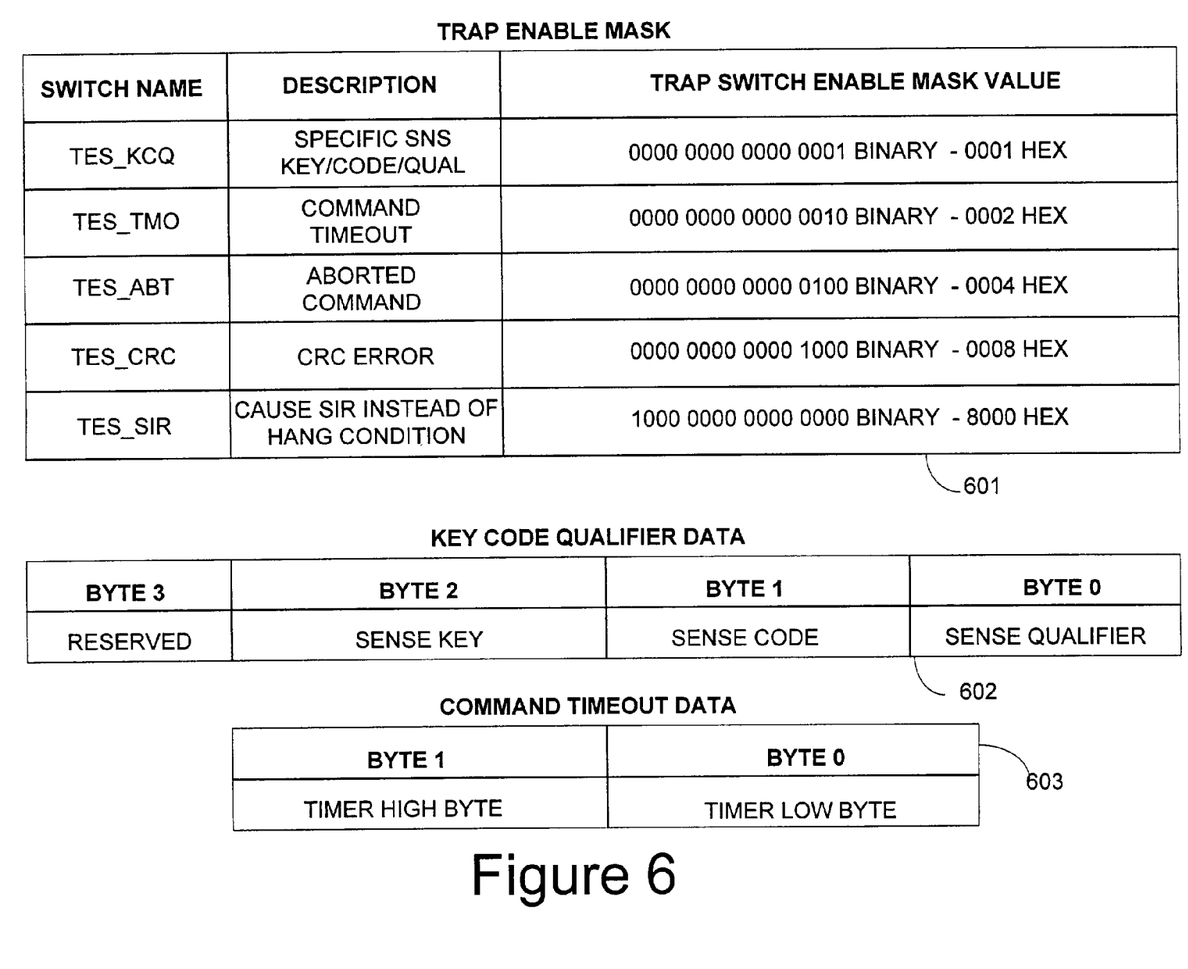
FIG. 6 is a table of representative values of the trap enable mask and associated data, showing the meaning of various mask bits, according to the preferred embodiment.

FIG. 6 is a table of representative values of the trap enable mask and associated data 327, showing the meaning of various mask bits, according to the preferred embodiment. Trap enable data 327 is used to selectively enable trapping on the occurrence of certain errors for more detailed error analysis, as described further herein. Trap enable data includes a trap enable mask 601 (preferably 16 bits) for independently enabling or disabling a plurality of trap switches, or which four are shown in FIG. 6. The highest order mask bit, TES_SIR, is not used for enabling/disabling trapping, but is used to specify the action taken in the event of a trap. I.e., in the event of a trap, the device may either hang in an infinite loop, or may reset itself after dumping certain state data to storage, depending on the value of TES_SIR bit. Switch bit TES_KCQ enables trapping on the occurrence of a specific Key/Code/Qualifier error type, the Key/Code/Qualifier value being specified in a separate associated data field 602. Switch bit TES_TMO enables trapping on the occurrence of a command timeout, the length of timeout (in milliseconds) being specified in a separate associated data field 603. Switch bit TES_ABT enables trapping on the receipt of an abort command from the host. Switch bit TES_CRC enables trapping upon the occurrence of a CRC (cyclic redundancy check) error in the read buffer. In the preferred embodiment, trap enable data 327 is kept in memory 323 like trace mask 326. Trap data is referenced only upon the occurrence of an error (i.e., relatively infrequently), and therefore it is believed unnecessary to dedicate a register for that purpose. However, it could alternatively be kept in a register.

The tables, buffers and other structures described above may be organized according to any of various known formats for organizing similar data. In addition to the tables and structures specifically mentioned, RAM 323 further contains the dynamic working memory variables and data structures used by controller processor 321 to direct various aspects of control program execution not essential to an understanding of the present invention.

Operation

In operation, a control program in ROM 322 executing on processor 321 contains multiple conditionally activated trace points. Upon the occurrence of an error, a subset of trace points associated with the error is activated for a limited period of time, and trace data is collected from these activated trace points. In a further alternative embodiment, a host activates the trace by ordering the device to trace a subset of trace points for a limited period of time.

Figure 7:
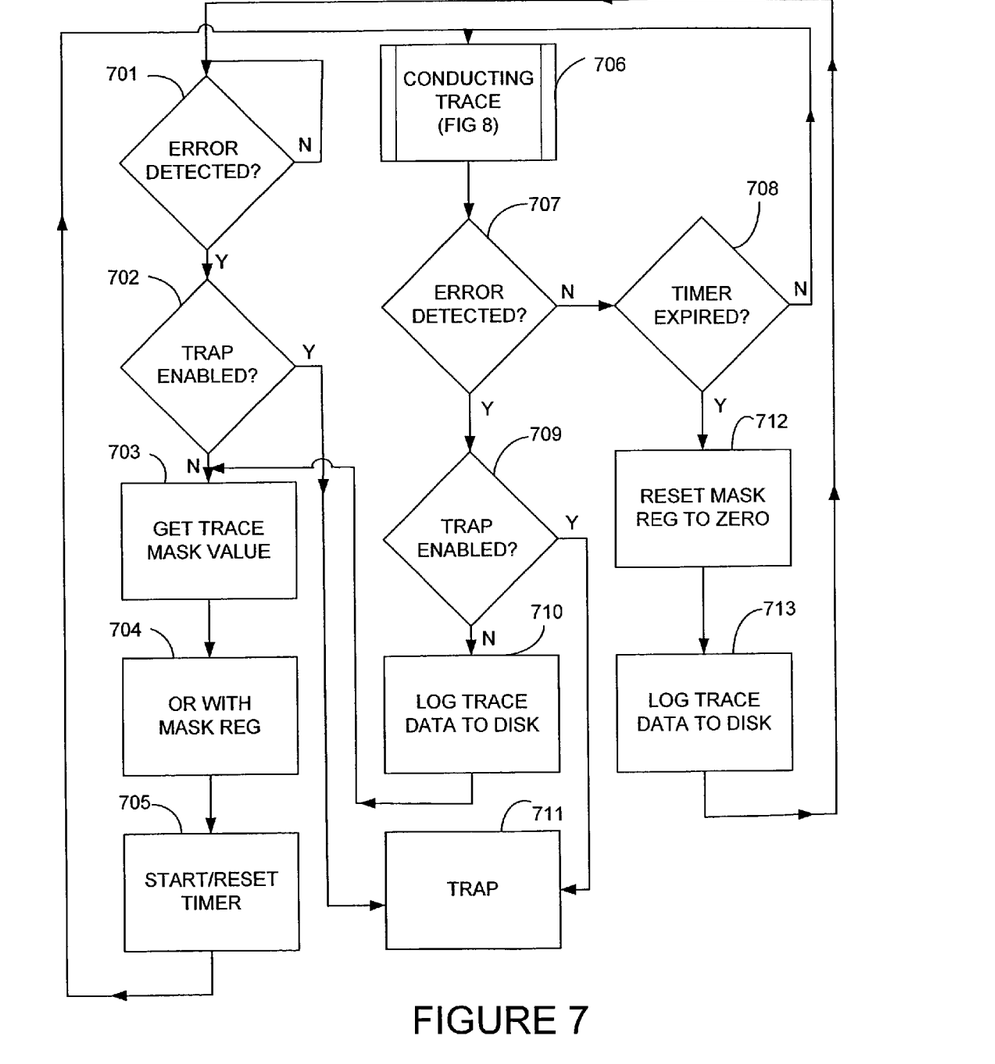
FIG. 7 is a high-level flow diagram illustrating the process of collecting trace data from selective trace points, according to the preferred embodiment.

FIG. 7 is a high-level flow diagram illustrating the process of collecting trace data from selective trace points and selectively trapping, according to the preferred embodiment. Referring to FIG. 7, in an initial (non-tracing) state, the control program is running normally without tracing enabled to control the operation of drive 200, shown as the short loop from the "N" branch at step 701. In this state, trace switch enable mask 326 is set to zero. When an error is detected, the "Y" branch is taken from step 701.

If trapping of the detected error condition is enabled, the "Y" branch is taken from step 702 to trap at step 711. The control program determines whether trapping is enabled for the specific error which occurred by examining the contents of trap mask and associated data 327. A trap must be enabled for the specific error; if trapping is enabled for some other error, or is not enabled at all (all the trap mask bits are zero), then the "N" branch is taken from step 702.

The control program then determines the mask value corresponding to the type of error detected from table 324 (step 703). This mask value from table 324 is logically ORed with the current contents of trace enable mask 326, and the result stored in trace mask 326 to enable trace points relevant to the error detected (step 704). A trace timer is then started or reset with a pre-determined value (step 705).

The control program then executes normally to control the operation of drive 200, and at the same time collects trace data when certain trace points are encountered during execution. This phase is depicted in FIG. 7 as block 706, and is also illustrated in additional detail in FIG. 8.

If another error is detected while collecting trace data (the "Y" branch from step 707), the control program again determines whether trapping is enabled for the error which occurred (step 709), as described above for step 702). If so, the "Y" branch is taken from step 709 to a trap at step 711. Otherwise, the "N" branch is taken from step 709, and the trace data in trace buffer 325 is logged to a reserved area of disk storage (step 710). The control program then repeats steps 703–705 to again set the value of trace mask 326 and restart the timer, and trace data is again collected (step 706). It will be observed that, if the error detected was the same as a previous error, step 704 will have no effect on the value of trace mask 326; if, on the other hand, the error detected was a new error not previously detected, the value of trace mask 326 may change so that the switches now enabled are the union of the subset of switches associated with the error just detected and the subset of switches associated with any previous error or errors being traced.

If the timer expires without another error being detected, the "Y" branch is taken from step 708. In this case, the value in trace mask 326 is reset to zero (step 712), and the trace data in trace buffer 325 is logged out to a reserved area of disk storage (step 713). The control program then returns to a state in which trace data is not being collected.

If a trap is reached at step 711, the controller may take one of two alternative courses of action, depending on the value of the TES_SIR bit in trap enable data 327. If TES_SIR is set off, the control program is placed in an infinite idle loop. This has the effect of preserving register and memory contents until they can be examined by service personnel, or until manual intervention causes a power loss, software re-initialization, or similar event. If TES_SIR is set on, the drive automatically dumps certain pre-identified state data to a reserved storage area of a disk surface, and then performs a re-initialization. Thus, a trap can be used to obtain more detailed information about the logic state of the controller at the time an error is detected.

Figure 8:
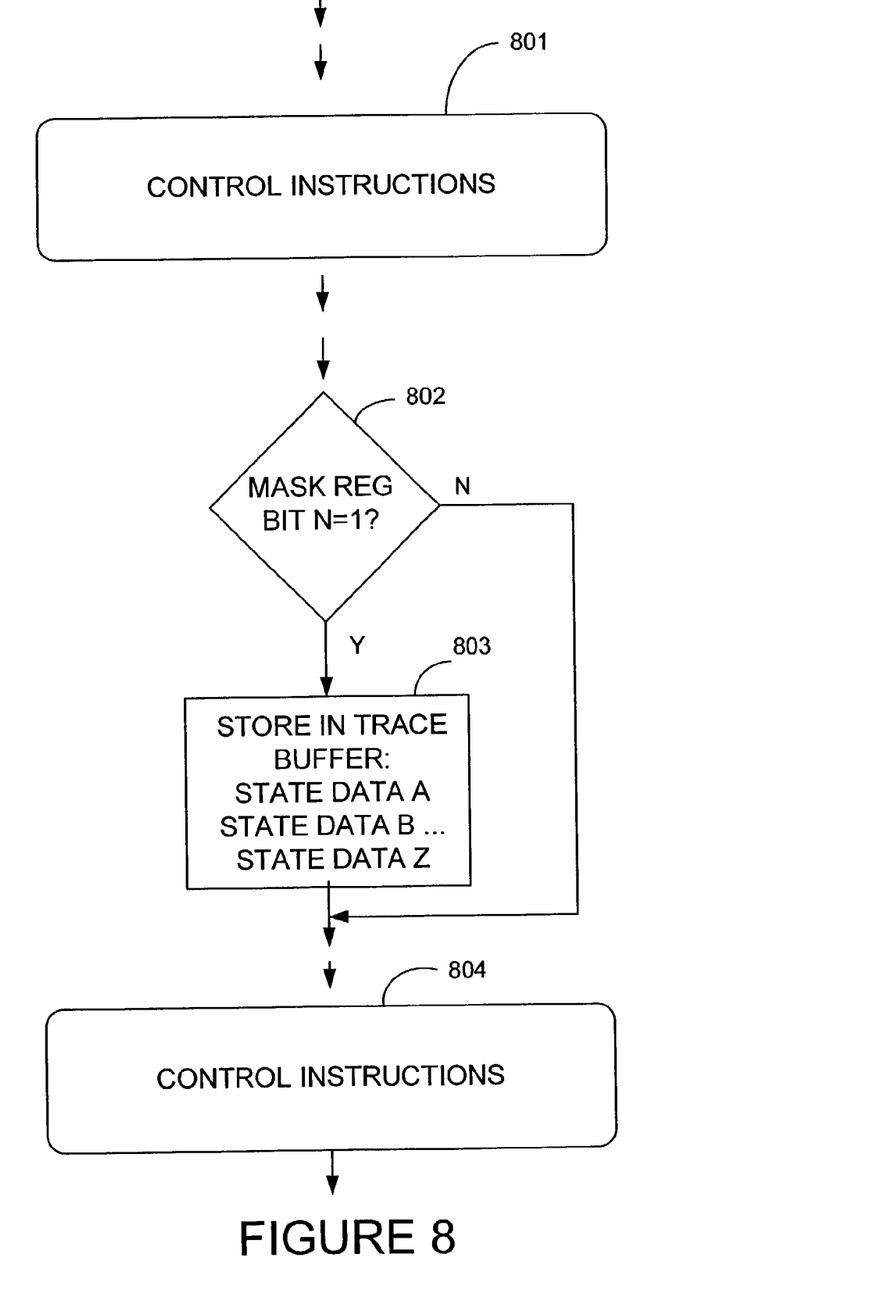
FIG. 8 is a conceptual illustration of the function of a trace point embedded in the control program, according to the preferred embodiment.

FIG. 8 is a conceptual illustration of the function of a trace point embedded in the control program. FIG. 8 shows only a single embedded trace point, it being understood that many such trace points may exist. As shown in FIG. 8, a flow of control in the control program causes a sequence of control instructions 801 to execute until a trace point is encountered, represented as steps 802 and 803. At the trace point, the controller examines the value of a specific bit ("Bit N") in trace switch enable mask 326. If this bit is set to 0, the trace point is ignored, and control instructions 804 continue normally. If this bit is set to 1, then certain state data is stored in trace buffer 325 (step 803), and the controller then continues execution of instructions 804 normally. Preferably, the state data stored at step 803 varies for each trace point, i.e., each trace point is coded to dump only the state data deemed relevant to the particular code path being traced by that trace point. In the preferred embodiment, the state data dumped by each respective trace point is fixed for the respective trace point (although it varies from one trace point to another). However, it would alternatively be possible to vary this state data for an individual trace point, depending on the type of error being traced or some other factor.

In the preferred embodiment, all subsets of trace points associated with the "switches" are disjoint, so that only one bit in trace mask 326 activates any particular trace point. However, it would alternatively be possible for different switches to enable overlapping sets of trace points, in which case some trace points might be enabled alternatively by more than one switch. In this case, the values of multiple bits from trace mask would be examined in step 802.

FIGS. 7 and 8 are intended to illustrate processes at a conceptual level, and do not necessarily correspond to particular code paths or instructions. Specifically, the loop represented by steps 706–708 in FIG. 6 is meant to show merely that the control program continues to execute and perform an internal trace until either an error is detected or the timer expires. The occurrence of either of these events might be detected using interrupts, polling, or any other conventional means. Similarly, a trace point may contain in-line code performing the function indicated, a call to a subroutine, a software interrupt, or any of various other programming devices or combinations thereof.

Since trapping is a fairly radical intrusion into the normal operation of the device, it is expected that trap enable data 327 is normally set so that no traps are enabled, i.e., the trap enable mask bits are set to zero. A trap is typically enabled where a system administrator, service person, or similar operator wishes to obtain more detailed information about an error that has already occurred (and, perhaps, is recurring). In the preferred embodiment, the trap enable bits and associated trap data 327 are set by direct write to the drive's memory 323 using a diagnostic port, such as a UART or similar port (not shown). I.e., the operator will attach a diagnostic device to the diagnostic port of the drive, and write data into the memory of the drive in the trap data 327. The drive will then continue to operate normally until the error condition of interest recurs. The same diagnostic port and diagnostic device can then be used to read out the contents of drive memory and registers. It would alternatively be possible to define a host interface command which would allow the host to set the trap enable data using the normal host interface (without a separate diagnostic port), but this option supposes that the host interface is functioning properly in the drive (which might not always be the case).

It will be understood that certain disk drive operations unrelated to tracing and the collection of diagnostic data have not necessarily been described in detail above or shown in the figures. In fact, a disk drive typically performs multiple concurrently executing tasks, of which those described herein are only a portion. A typical disk drive responds to many different types of commands; responsive behavior may be very complex; exchange of information with the host may require many steps; etc. These details have been omitted from the description herein for clarity of illustration.

Additional Considerations

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning digital devices such as disk drives, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as memory 102, in FIG. 2 as disk surface 202, in FIG. 3 as ROM 322.

In the preferred embodiment, the peripheral device which performs internal tracing and collection of diagnostic data as described above is a rotating magnetic disk drive device. However such a peripheral device could be some other form of data storage device, such as a tape drive, an optically read disk, or an array of storage devices such as a commonly known "RAID", or "Redundant Array of Independent Disks". Furthermore, such a peripheral device need not be a data storage device at all, and may be a printer, a fax machine, a network connection, or any of various other peripheral devices. In the latter case, it is desirable to find some location for storing trace data. If the peripheral device is not a data storage device, trace data can alternatively be uploaded to the host for storing in a host data storage device. It will be understood that if the peripheral device is not a disk storage device, the types of errors encountered and traced will typically be different.

Although a specific embodiment of the invention has been disclosed along with certain alternatives, it will be recognized by those skilled in the art that additional variations in form and detail may be made within the scope of the following claims:

What is claimed is:

1. A method of operating a peripheral digital device attached to a host digital system, comprising the steps of:
   detecting an error of a first type in a function of said peripheral digital device;
   responsive to detecting said error, automatically determining, from a set of traceable activity in said peripheral device, a first subset of said set of traceable activity, said first subset corresponding to said first type of error, said first subset not including the whole of said set of traceable activity in said peripheral device;
   responsive to said step of automatically determining a first subset automatically collecting trace data in said peripheral device generated by said first subset of traceable activity;
   detecting an error of a second type in a function of said peripheral digital device;
   responsive to detecting said error of a second type, automatically determining, from said set of traceable activity in said peripheral device, a second subset of said set of traceable activity, said second subset corresponding to said second type of error, said second subset not including the whole of said set of traceable activity in said peripheral device, said second subset being different from said first subset; and
   responsive to said step of automatically determining a second subset, automatically collecting trace data in said peripheral device generated by said second subset of traceable activity.

2. The method of operating a peripheral digital device of claim 1, wherein said peripheral digital device is a rotating magnetic disk drive data storage device.

3. The method of operating a peripheral digital device of claim 1, wherein said set of traceable activity comprises a plurality of trace points embedded in programming code which controls the operation of said peripheral digital device, and wherein said first subset of said set of traceable activity comprises a subset of said plurality of trace points.

4. The method of operating a peripheral digital device of claim 1, wherein said step of automatically collecting trace data in said peripheral device generated by said first subset of traceable activity comprises:
   setting the value of a trace mask to enable collecting trace data in generated by said first subset of traceable activity.

5. The method of operating a peripheral digital device of claim 4, wherein said set of traceable activity comprises a plurality of trace points embedded in programming code which controls the operation of said peripheral digital device, each said trace point being enabled depending on the value of at least one bit of said trace mask.

6. The method of operating a peripheral digital device of claim 1, wherein said step of automatically collecting trace data in said peripheral device generated by said first subset of traceable activity and said step of automatically collecting trace data in said peripheral device generated by said second subset of traceable activity are performed concurrently.

7. The method of operating a peripheral digital device of claim 1, further comprising the steps of:
   responsive to detecting said error of a first type, determining whether a trap is selectively enabled for said error of a first type; and
   executing a trap if it is determined that a trap is selectively enabled for said error of a first type.

8. A peripheral digital device for attaching to a host system, comprising:
   a programmable processor;
   a memory;
   a control program resident in said memory for controlling the operation of said peripheral digital device, said control program containing a plurality of selectively enabled trace points, each said selectively enabled trace point causing respective trace data to be collected if the corresponding trace point is encountered during execution of said control program when the corresponding trace point is in an enabled state, said control program further containing an automatic error tracing function, said automatic error tracing function automatically causing different subsets of said plurality of selectively enabled trace points to be enabled responsive to detecting errors of different types, each error type being associated with a respective subset of said plurality of selectively enabled trace points which is enabled responsive to detecting an error of the corresponding type;
   wherein said control program further comprises a selectively enabled error trapping function, said selectively enabled error trapping function causing a trap to execute responsive to detecting said error of a type for which a trap is selectively enabled.

9. The peripheral digital device of claim 8, wherein said peripheral digital device is a data storage device, and collected trace data is stored in a storage medium of said data storage device.

10. The peripheral digital device of claim 9, wherein said peripheral digital device is a rotating magnetic disk drive data storage device.

11. The peripheral digital device of claim 8, wherein said different subsets of said selectively enabled trace points are disjoint.

12. The peripheral digital device of claim 8, wherein said automatic error tracing function of said control program automatically sets the value of a plurality of bits in a trace mask to selectively enable said selectively enabled trace points, each bit enabling one or more of said selectively enabled trace points.

13. A control program product for controlling the operation of a peripheral digital device attached to a host digital system, comprising:
   a plurality of processor-executable instructions recorded on tangible signal-bearing media, said instructions including a plurality of selectively enabled trace points, wherein said instructions, when executed by at least one processor of said peripheral digital device, cause the device to perform the steps of:
   (a) detecting an error of a first type in a function of said peripheral digital device;
   (b) responsive to detecting said error, automatically determining a first subset of said plurality of selectively enabled trace points, said first subset corresponding to said first type of error, said first subset not including all of said plurality of selectively enabled trace points in said control program; and
   (c) responsive to said determining step, automatically collecting trace data in said peripheral device when a trace point in said first subset is encountered during execution of said control program, wherein said step of automatically collecting trace data in said peripheral device comprises setting the value of a plurality of bits in a trace mask to selectively enable said selectively enabled trace points, each bit enabling one or more of said selectively enabled trace points.

14. The control program product of claim 13, wherein said peripheral digital device is a rotating magnetic disk drive data storage device.

15. The control program product of claim 13, wherein said instructions, when executed by said at least one processor of said peripheral digital device, further cause the device to perform the steps of:
   (d) detecting an error of a second type in a function of said peripheral digital device;
   (e) responsive to detecting said error of a second type, automatically determining a second subset of said plurality of selectively enabled trace points, said second subset corresponding to said second type of error, said second subset not including all of said selectively enabled trace points in said control program, said second subset being different from said first subset; and
   (f) responsive to said determining step (e), automatically collecting trace data in said peripheral device when a trace point in said second subset is encountered during execution of said control program.

16. The control program product of claim 15, wherein said step of automatically collecting trace data in said peripheral device when a trace point in said first subset is encountered and said step of automatically collecting trace data in said peripheral device when a trace point in said second subset is encountered are performed concurrently.

17. The control program product of claim 13, wherein said instructions, when executed by said at least one processor of said peripheral digital device, further cause the device to perform the steps of:
   (d) responsive to detecting said error of a first type, determining whether a trap is selectively enabled for said error of a first type; and
   (e) executing a trap if it is determined that a trap is selectively enabled for said error of a first type.

* * * * *